(12) United States Patent
Hsieh et al.

(10) Patent No.: US 8,891,854 B2
(45) Date of Patent: Nov. 18, 2014

(54) DEVICE AND METHOD FOR TRANSFORMING 2D IMAGES INTO 3D IMAGES

(75) Inventors: Chun-Hsing Hsieh, Hsinchu (TW); Hsu-Jung Tung, Zhubei (TW); Chia-Wei Yu, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 207 days.

(21) Appl. No.: 13/435,238

(22) Filed: Mar. 30, 2012

(65) Prior Publication Data

US 2012/0263374 A1 Oct. 18, 2012

Related U.S. Application Data

(60) Provisional application No. 61/469,837, filed on Mar. 31, 2011.

(30) Foreign Application Priority Data

Mar. 2, 2012 (TW) .............................. 101107097 A

(51) Int. Cl.
*G06K 9/00* (2006.01)
*H04N 13/02* (2006.01)
*H04N 13/04* (2006.01)

(52) U.S. Cl.
CPC .......... *H04N 13/026* (2013.01); *H04N 13/0438* (2013.01)
USPC ....................................................... 382/154

(58) Field of Classification Search
CPC ........................................................ G06K 9/36
See application file for complete search history.

(56) References Cited

U.S. PATENT DOCUMENTS 5,929,859 A     7/1999  Meijers
2008/0094416 A1*  4/2008  MacInnis et al. ............. 345/629
2012/0307023 A1* 12/2012  Freiburg et al. ................ 348/51

FOREIGN PATENT DOCUMENTS

WO     2010084716 A1    7/2010

OTHER PUBLICATIONS

CN Office Action dated Feb. 11, 2014.

* cited by examiner

*Primary Examiner* — Atiba O Fitzpatrick
*Assistant Examiner* — Thomas A James
(74) *Attorney, Agent, or Firm* — McClure, Qualey & Rodack, LLP

(57) ABSTRACT

A device for transforming 2D images into 3D images includes a position calculation unit and an image processing block. The position calculation unit generates multiple start points corresponding to multiple pixel lines of a panel according to a display type of the panel. The image processing block reshapes multiple input enable signals into multiple output enable signals according to the start points. The pixel lines of the panel displays the output data signal as multiple image signals respectively according to the output enable signals. The image signals include multiple left-eye image signals and multiple right-eye image signals.

24 Claims, 6 Drawing Sheets

DEVICE AND METHOD FOR TRANSFORMING 2D IMAGES INTO 3D IMAGES

This application claims the benefits of U.S. provisional application No. 61/469,837, filed Mar. 31, 2011, and Taiwan application Ser. No. 101107097, filed Mar. 2, 2012, the subject matters of which are incorporated herein by reference.

BACKGROUND

1. Technical Field

The disclosure relates to a device and a method for transforming 2D images into 3D images.

2. Background

With vigorous development of modern technology, people starts to seek visual enjoyments realer than what 2D image devices present. Therefore related techniques of 3D images have gradually been mature, and applications of utilizing 3D glasses to enjoy dynamic images of the 2D image devices have been popularized. Currently common 2D image devices have to firstly perform depth analyses on 2D images to estimate and obtain a corresponding depth table, perform an image processing on the 2D images cooperated with the depth table to render dual images of the corresponding glasses, such as 3D glasses, polarized glasses or shutter glasses, and then cooperate with said glasses to achieve 3D effects and form the 3D images. However, depth analyses and estimation of the depth table usually consume huge hardware resources, and additional memories are needed for storage.

SUMMARY

The disclosure is directed to a device and a method for transforming 2D images into 3D images, utilizing simple procedure and calculation to present 3D effects of the 2D images.

In an exemplary embodiment, a device for transforming 2D images into 3D images is disclosed. The device includes a position calculation unit and an image processing block. The position calculation unit generates multiple start points corresponding to multiple pixel lines of a panel according to a display type of the panel. The image processing block reshapes multiple input enable signals corresponding to the pixel lines into multiple output enable signals according to the start points. The pixel lines of the panel displays an output data signal as multiple image signals respectively according to the output enable signals. The image signals include multiple left-eye image signals and multiple right-eye image signals.

In another exemplary embodiment, a method for transforming 2D images into 3D images, applied to a device for transforming 2D images into 3D images, is provided. The device includes a position calculation unit and an image processing block. The method includes the following steps. The position calculation unit is utilized to generate multiple start points corresponding to multiple pixel lines of a panel according to a display type of the panel. The image processing block is utilized to reshape multiple input enable signals corresponding to the pixel lines into multiple output enable signals according to the start points. The pixel lines of the panel are utilized to display an output data signal as multiple image signals respectively according to the output enable signals. The image signals include multiple left-eye image signals and multiple right-eye image signals.

The disclosure will become apparent from the following detailed description of the non-limiting embodiments. The following description is made with reference to the accompanying drawings.

DETAILED DESCRIPTION OF THE DISCLOSURE

The disclosure proposes a device and a method for transforming 2D images into 3D images, utilizing simple procedure and calculation to shift data to obtain left-eye images and right-eye images, thus capable of presenting 3D effects of 2D images without depth analysis and estimation and additional data storage.

Figure 1:
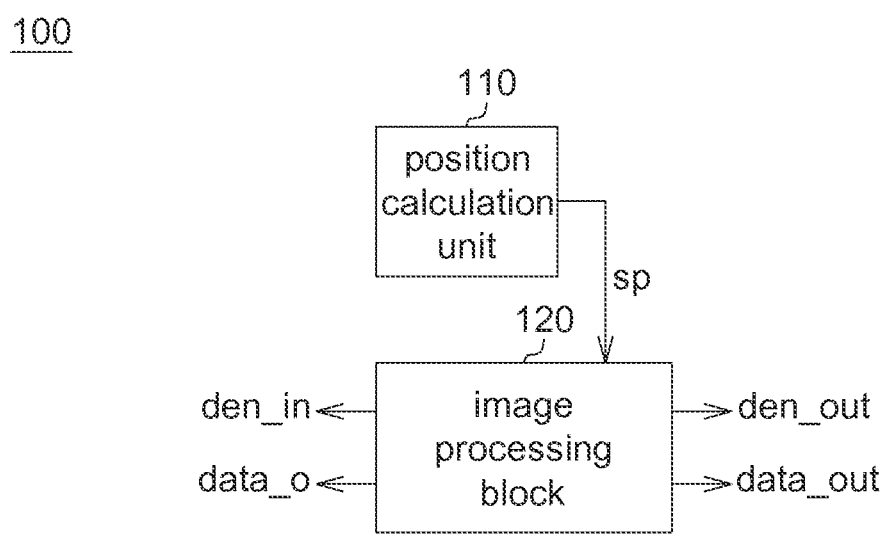
FIG. 1 shows a block diagram illustrating a device for transforming 2D images into 3D images in an exemplary embodiment.

Referring to FIG. 1, a block diagram illustrating a device for transforming 2D images into 3D images in an exemplary embodiment is shown. The device 100 for transforming 2D images into 3D images includes a position calculation unit 110 and an image processing block 120. The position calculation unit 110 generates multiple start points sp corresponding to multiple pixel lines of a panel according to a display type of the panel. The panel is, for example, a passive retarder (PR) type panel or a shutter glass type panel without limitation thereto. The position calculation unit 110 further refers to a constant, a polynomial or a lookup table to determine difference values between the start points to generate the start points sp according to the display type of the panel.

The image processing block 120 reshapes multiple input enable signals den_in corresponding to the pixel lines into multiple output enable signals den_out according to the start points sp, and outputs the output enable signals den_out and an output data signal data_out to the panel. The panel displays the output data signal data_out as multiple image signals respectively according to the output enable signals den_out, the image signals including multiple left-eye image signals and multiple right-eye image signals. The image signals shown on the panel are not limited to be shown in one single image frame. When the panel is a PR type panel, the left-eye image signals and the right-eye image signals are such as alternately arranged in one single image frame; when the panel is a glass shutter type panel, the left-eye image signals and the right-eye image signals are such as alternately arranged in different image frames.

Figure 2:
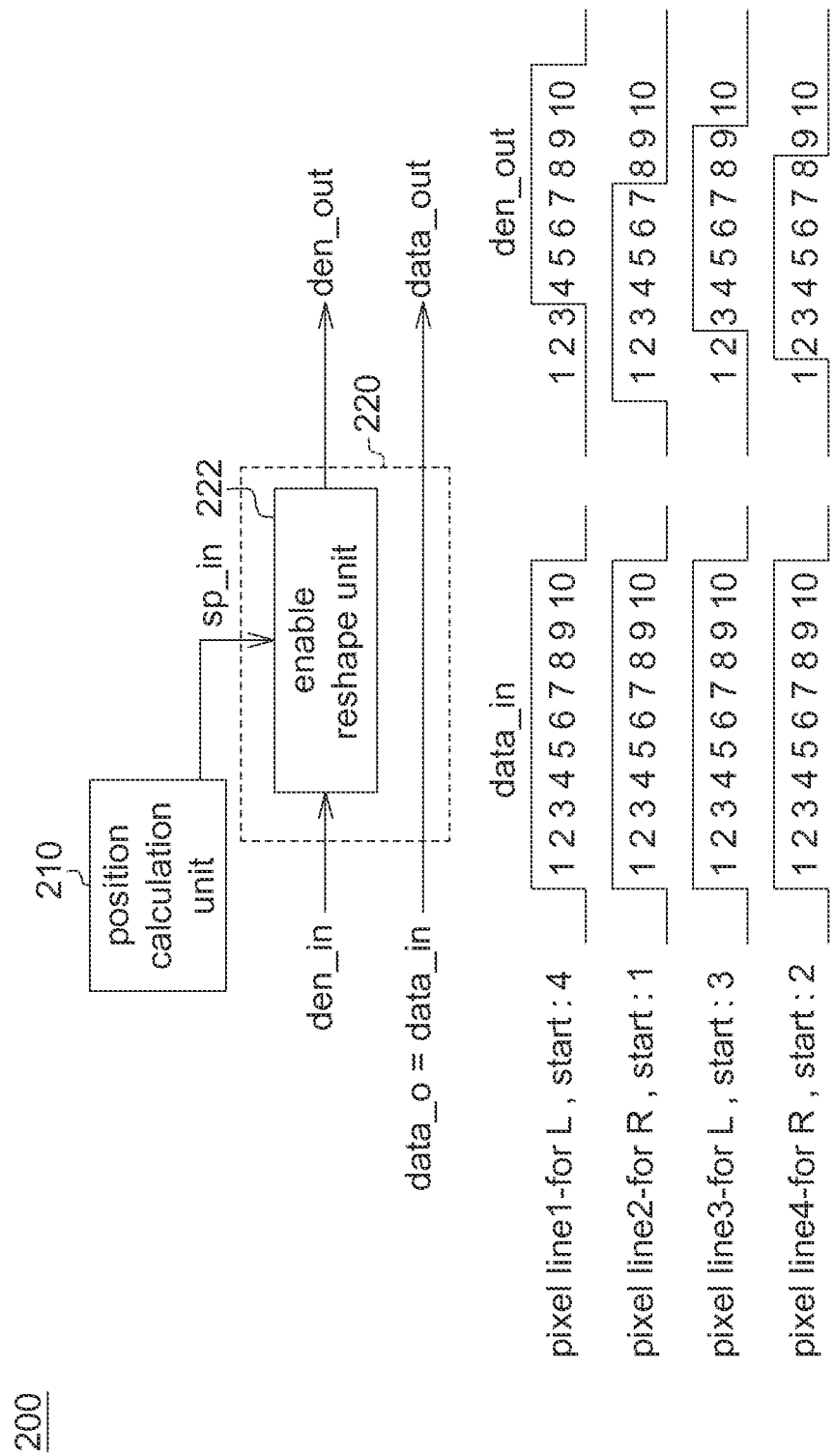
FIG. 2 shows a block diagram illustrating a device for transforming 2D images into 3D images corresponding to a PR type panel in an exemplary embodiment.

Referring to FIG. 2, a block diagram illustrating a device for transforming 2D images into 3D images corresponding to a PR type panel according to an embodiment is shown. The device 200 for transforming 2D images into 3D images includes a position calculation unit 210 and an image processing block 220. The position calculation unit 210 generates multiple start points sp corresponding to multiple pixel lines of a panel according to a display type of the panel. Due to the PR type panel, in a current image frame, the image signals corresponding to the odd pixel lines are the left-eye image signals, the image signals corresponding to the even pixel lines are the right-eye image signals, and it is not limited thereto and can be designed oppositely according to the user's requirements. That is, for the PR type panel, the left-eye image signals and the right-eye image signals are alternately arranged in the same image frame.

Therefore, as shown in FIG. 2, the start points 4, 3, . . . , corresponding to the pixel lines 1, 3, . . . , are decreasing, and the start points 1, 2, . . . , corresponding to the pixel lines 2, 4, . . . , are increasing. In FIG. 2, it takes the start points corresponding to the odd pixel lines being decreasing and the start points corresponding to the even pixel lines being increasing for example without limitation, or the like as long as the start points corresponding to the odd pixel lines are at least monotonic decreasing and the start points corresponding to the even pixel lines are at least monotonic increasing. Furthermore, it is on condition that the start points preset a linear function.

The image processing block 220 includes an enable reshaping unit 222. The enable reshaping unit 222 reshapes the input enable signals den_in into the output enable signals den_out according to integer parts sp_in of the start points sp. Besides, the image processing block 220 does not process an original data signal data_o and regards it as an input data signal data_in and then outputs it to be an output data signal data_out. Consequently, the pixel lines of the panel displays the output data signal data_out as multiple image signals respectively according to output enable signals den_out.

Figure 3:
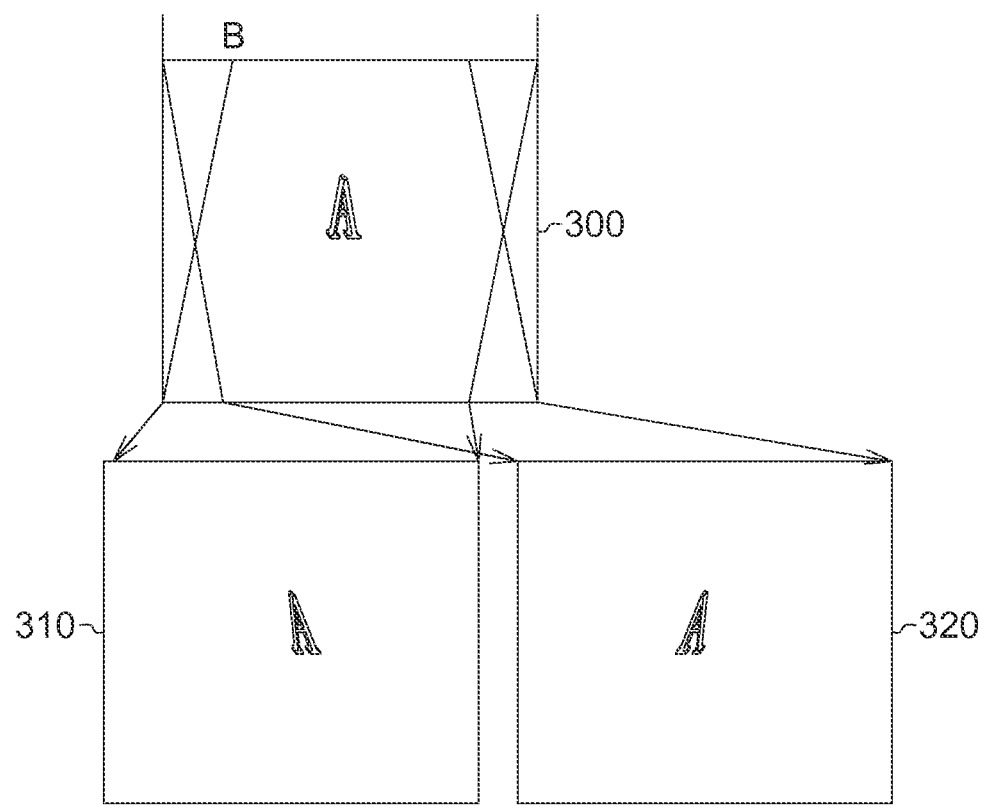
FIG. 3 shows a schematic illustration of a method for transforming 2D images into 3D images in an exemplary embodiment.

Referring to FIG. 3, a schematic illustration of a method for transforming 2D images into 3D images according to an embodiment is shown. In FIG. 3, an original data signal data_o corresponding to the 2D image 300 is processed by the above-mentioned devices 100/200 for transforming 2D images into 3D images, and then the left-eye image signals read out by the odd pixel lines of the panel correspond to a left-eye image frame 310, and the right-eye image signals read out by the even pixel lines of the panel correspond to a right-eye image frame 320. The left-eye image frame 310 and the right-eye image frame 320 are processed by hardware, such as a 3D glass, and then the user can see 3D images.

In addition, relative depth relationships between the panel and the multiple image frames corresponding to the image signals are related to an initial start point B among the start points. That is, it can control the initial start point B in FIG. 3 to determine the relative depth relationships between the panel and the image frames. And difference values between the start points sp determine the deepest rage to the shallowest range of the image frames corresponding to the image signals.

Figure 4:
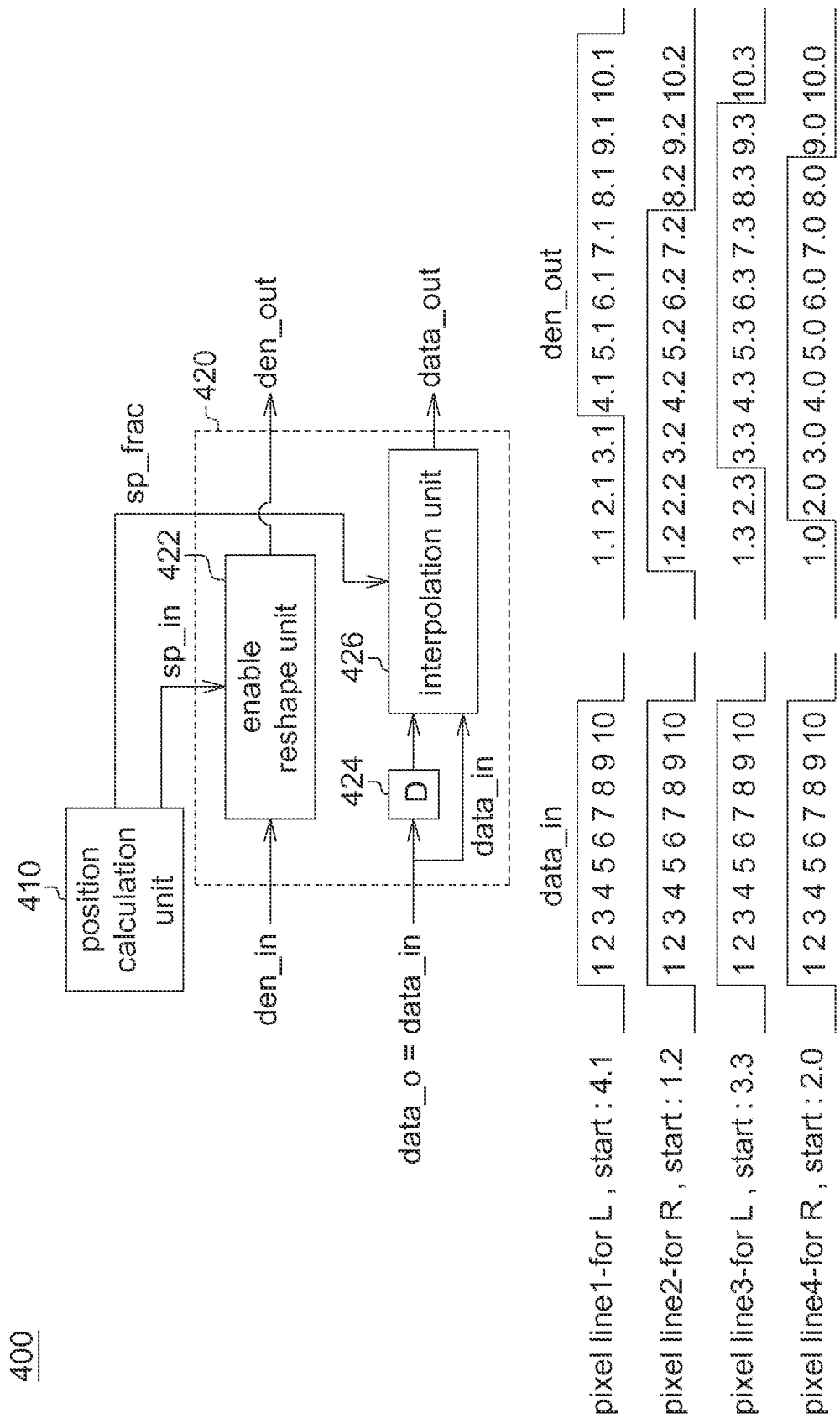
FIG. 4 shows a block diagram illustrating a device for transforming 2D images into 3D images corresponding to a PR type panel in another exemplary embodiment.

In addition, the start points further include fractional parts to make the 3D images smoother. Referring to FIG. 4, a block diagram illustrating a device for transforming 2D images into 3D images corresponding to a PR type panel according to another embodiment is shown. The device 400 for transforming 2D images into 3D images includes a position calculation unit 410 and an image processing block 420. The position calculation unit 410 generates multiple start points sp corresponding to multiple pixel lines of a panel according to a display type of the panel, the panel being a PR type panel. The start points sp include integer parts sp_in and fractional parts sp_frac. As shown in FIG. 4, the start points 4.1, 3.3, . . . , corresponding to the pixel lines 1, 3, . . . , are decreasing, and the start points 1.2, 2.0, . . . , corresponding to the pixel lines 2, 4, . . . , are increasing.

The image processing block 420 includes an enable reshaping unit 422, a delay unit 424 and an interpolation unit 426. The enable reshaping unit 422 reshapes the input enable signals den_in into the output enable signals den_out according to integer parts sp_in of the start points sp. The delay unit 424 delays the input data signal data_in, equal to the original data signal data_o, one stage to obtain a delay data signal. Then the interpolation unit 426 performs an interpolation operation on the input data signal data_in and the delay data signal according to the fractional parts sp_frac of the start points sp to obtain the output data signal data_out. Take the stat point 4.1 of the pixel line 1 for example, in addition to shift the input enable signal 4 units, the pixel data 4 and the pixel data 5 are interpolated according to the fractional part 0.1 of the start point. That is, (the pixel data 4)×0.9 plus (the pixel data 5)×0.1 equals to the pixel data 4.1. Consequently, the pixel lines of the panel read the output data signal data_out respectively according to output enable signals den_out to obtain multiple smoother image signals.

Figure 5:
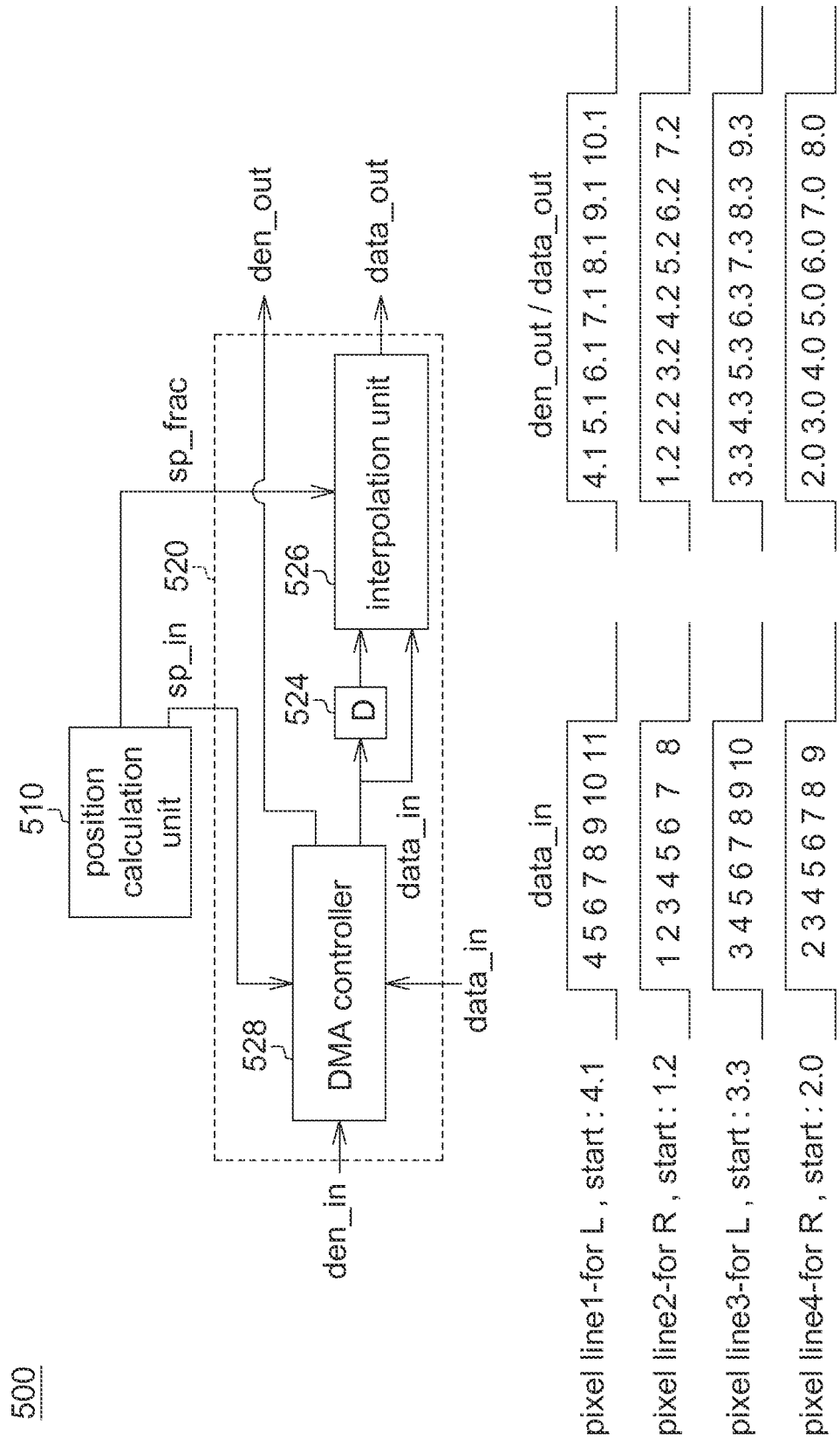
FIG. 5 shows a block diagram illustrating a device for transforming 2D images into 3D images corresponding to a PR type panel in another exemplary embodiment.

In addition, the original data signal data_o may be the de-compressed data stored in a memory. Referring to FIG. 5, a block diagram illustrating a device for transforming 2D images into 3D images corresponding to a PR type panel according to another embodiment is shown. The device 500 for transforming 2D images into 3D images includes a position calculation unit 510 and an image processing block 520. The position calculation unit 510 generates multiple start points sp corresponding to multiple pixel lines of a panel according to a display type of the panel, the panel being a PR type panel. The start points sp include integer parts sp_in and fractional parts sp_frac. As shown in FIG. 5, the start points 4.1, 3.3, . . . , corresponding to the pixel lines 1, 3, . . . , are decreasing, and the start points 1.2, 2.0, . . . , corresponding to the pixel lines 2, 4, . . . , are increasing.

The image processing block 520 includes a delay unit 524, an interpolation unit 526 and a direct memory access (DMA) controller 528. The DMA controller 528 reads an original data signal data_o from an external memory as an input data signal data_in according to the integer parts sp_in of the start points. Take the pixel line 1 for example, the integer part sp_in of the start point is 4, thus the DMA controller 528 shifts 4 memory addresses to access from the pixel data 4. And the DMA controller 528 adjusts pulse widths of the input enable signals den_in to obtain the output enable signals den_out. The delay unit 524 delays the input data signal data_in one stage to obtain a delay data signal. Then the interpolation unit 526 performs an interpolation operation on the input data signal data_in and the delay data signal according to the fractional parts sp_frac of the start points to obtain the output data signal data_out. Consequently, the pixel lines of the panel read the output data signal data_out respectively according to output enable signals den_out to obtain multiple smoother image signals.

In addition, the start points sp may be assumed to only include the integer parts to mitigate the overall computation, and the 3D effects can still be achieved. Consequently, the image processing block 520 can be simplified to only include the DMA controller 528. The DMA controller 528 receives the input data signal data_in and then directly outputs as the output data signal data_out without the delay and interpolation operations, thus mitigating the overall computation.

Figure 6:
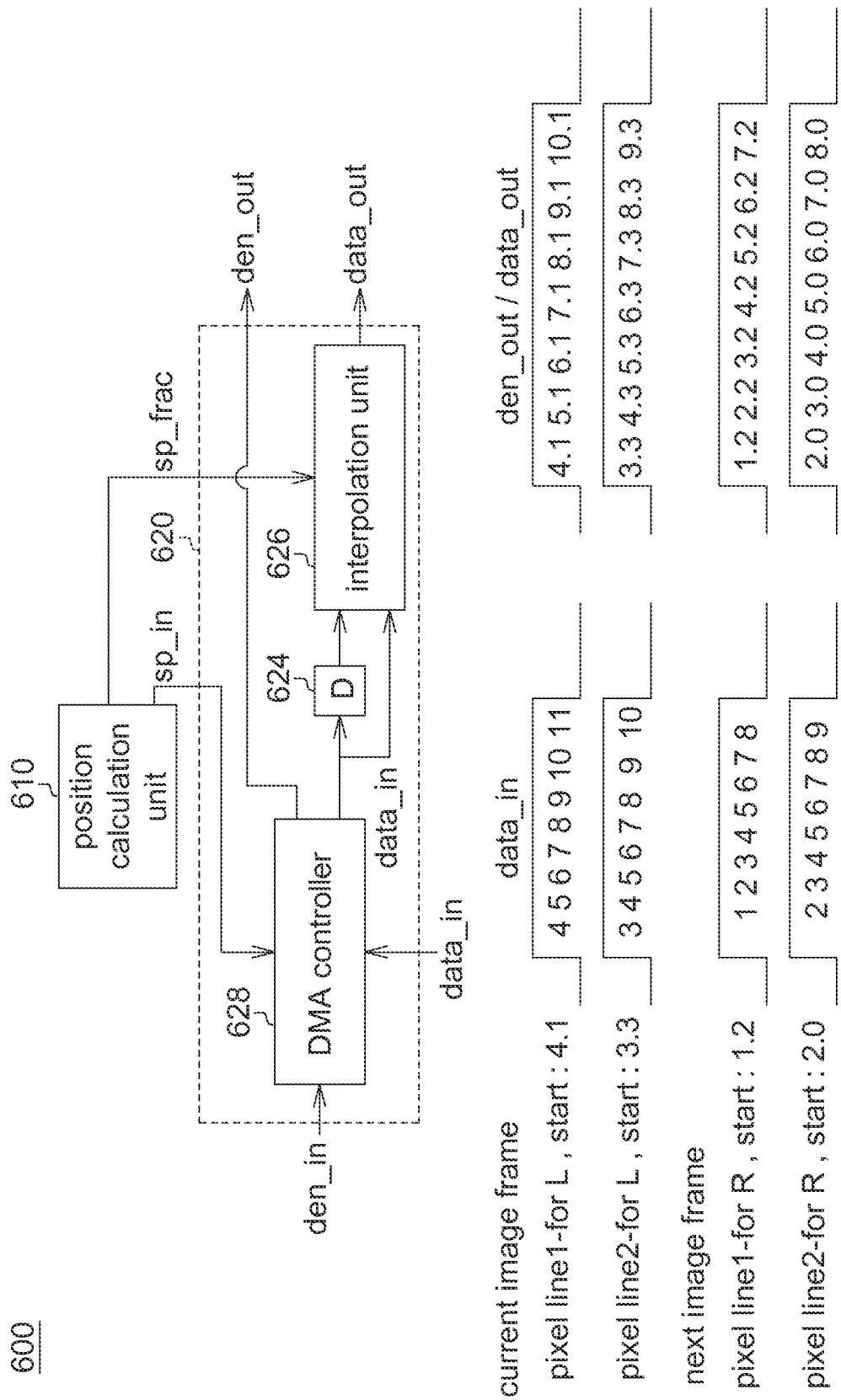
FIG. 6 shows a block diagram illustrating a device for transforming 2D images into 3D images corresponding to a shutter glass type panel in an embodiment.

Referring to FIG. 6, a block diagram illustrating a device for transforming 2D images into 3D images corresponding to a shutter glass type panel according to an embodiment is shown. The device 600 for transforming 2D images into 3D images includes a position calculation unit 610 and an image processing block 620. The position calculation unit 610 generates multiple start points sp corresponding to multiple pixel lines of a panel according to a display type of the panel, the panel being a shutter glass type panel. The start points sp include integer parts sp_in and fractional parts sp_frac. Due to the shutter glass type panel, the image signals in a current image frame are the left-eye image signals, and the image signals in a next image frame are the right-eye image signals. That is, for the shutter glass type panel, the left-eye image signals and the right-eye image signals are alternately arranged in different image frames.

Therefore, as shown in FIG. 6, the start points 4.1, 3.3, . . . , corresponding to the pixel lines 1, 2, . . . , of the current image frame are decreasing, and the start points 1.2, 2.0, . . . , corresponding to the pixel lines 1, 2, . . . , of the next image frame are increasing. In FIG. 6, it takes the start points corresponding to the pixel lines of the current image frame being decreasing and the start points corresponding to the pixel lines of the next image frame being increasing for example without limitation, or the like as long as the start points corresponding to the pixel lines of the current image frame are at least monotonic decreasing and the start points corresponding to the pixel lines of the next image frame are at least monotonic increasing. Furthermore, it is on condition that the start points preset a linear function.

The image processing block 620 includes a delay unit 624, an interpolation unit 626 and a DMA controller 628. The DMA controller 628 reads an original data signal data_o from an external memory as an input data signal data_in according to the integer parts sp_in of the start points. Take the pixel line 1 of the current image frame for example, the integer part sp_in of the start point is 4, thus the DMA controller 628 shifts 4 memory addresses to access from the pixel data 4. Likewise, take the pixel line 2 of the next image frame for example, the integer part sp_in of the start point is 2, thus the DMA controller 628 shifts 2 memory addresses to access from the pixel data 2.

The DMA controller 628 adjusts pulse widths of the input enable signals den_in to obtain the output enable signals den_out. The delay unit 624 delays the input data signal data_in one stage to obtain a delay data signal. Then the interpolation unit 626 performs an interpolation operation on the input data signal data_in and the delay data signal according to the fractional parts sp_frac of the start points to obtain the output data signal data_out. Consequently, the pixel lines of the panel read the output data signal data_out respectively according to output enable signals den_out to obtain multiple smoother image signals.

In addition, the start points sp may be assumed to only include the integer parts to mitigate the overall computation, and the 3D effects can still be achieved. Consequently, the image processing block 620 can be simplified to only include the DMA controller 628. The DMA controller 628 receives the input data signal data_in and then directly outputs as the output data signal data_out without the delay and interpolation operations, thus mitigating the overall computation.

The disclosure further proposes a method for transforming 2D images into 3D images, applied to a device for transforming 2D images into 3D images. The device includes a position calculation unit and an image processing block. The method includes the following steps. The position calculation unit is utilized to generate multiple start points corresponding to multiple pixel lines of a panel according to a display type of the panel. The image processing block is utilized to reshape multiple input enable signals corresponding to the pixel lines into multiple output enable signals according to the start points. The pixel lines of the panel are utilized to display an output data signal as multiple image signals respectively according to the output enable signals. The image signals include multiple left-eye image signals and multiple right-eye image signals.

The detailed principles of the above-mentioned method for transforming 2D images into 3D images have been described in FIG. 2 to FIG. 6 and the related contents, so detailed description thereof will be omitted.

The device and the method for transforming 2D images into 3D images proposed in the disclosure utilize simple procedure and calculation to obtain multiple start points presenting at least monotonic decreasing, monotonic increasing or a linear function, and shift an original data signal corresponding to 2D images to obtain left-eye images and right-eye images, thus capable of presenting 3D effects of 2D images to the users without depth analysis and estimation and additional data storage.

While the disclosure has been described by way of example and in terms of an embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A device for transforming 2D images into 3D images, comprising:
    a position calculation circuit for generating a plurality of start points corresponding to a plurality of pixel lines of a panel according to a display type of the panel; and
    an image processing block for reshaping a plurality of input enable signals corresponding to the pixel lines into a plurality of output enable signals according to the start points;
    wherein the pixel lines of the panel displays an output data signal as a plurality of image signals respectively according to the output enable signals, the image signals including a plurality of left-eye image signals and a plurality of right-eye image signals; in a current image frame, the start points corresponding to the odd pixel lines are at least monotonic decreasing, the start points corresponding to the even pixel lines are at least monotonic increasing, the image signals corresponding to the odd pixel lines are the left-eye image signals, and the image signals corresponding to the even pixel lines are the right-eye image signals.

2. The device for transforming 2D images into 3D images according to claim 1, wherein the image processing block includes an enable reshaping circuit for reshaping the input enable signals into the output enable signals according to integer parts of the start points.

3. The device for transforming 2D images into 3D images according to claim 2, wherein the image processing block further comprises:
    a delay circuit for delaying an input data signal as a delay data signal; and
    an interpolation circuit for performing an interpolation operation on the input data signal and the delay data signal according to fractional parts of the start points to obtain the output data signal.

4. The device for transforming 2D images into 3D images according to claim 1, wherein the image processing block comprises:

a direct memory access controller for reading an original data signal from a memory as an input data signal according to integer parts of the start points, and adjusting the input enable signals to be the output enable signals;

a delay circuit for delaying the input data signal as a delay data signal; and an interpolation circuit for performing an interpolation operation on the input data signal and the delay data signal according to fractional parts of the start points to obtain the output data signal.

5. A device for transforming 2D images into 3D images, comprising:

a position calculation circuit for generating a plurality of start points corresponding to a plurality of pixel lines of a panel according to a display type of the panel; and an image processing block for reshaping a plurality of input enable signals corresponding to the pixel lines into a plurality of output enable signals according to the start points;

wherein the pixel lines of the panel displays an output data signal as a plurality of image signals respectively according to the output enable signals, the image signals including a plurality of left-eye image signals and a plurality of right-eye image signals, wherein the image processing block comprises:

a direct memory access controller for reading an original data signal from a memory as an input data signal according to integer parts of the start points, and adjusting the input enable signals to be the output enable signals;

a delay circuit for delaying the input data signal as a delay data signal; and an interpolation circuit performing an interpolation operation on the input data signal and the delay data signal according to fractional parts of the start points to obtain the output data signal;

wherein the image signals in a current image frame are the left-eye image signals and the start points are at least monotonic decreasing, and the image signals in a next image frame are the right-eye signals and the start points are at least monotonic increasing.

6. The device for transforming 2D images into 3D images according to claim 1, wherein the image processing block includes a direct memory access controller for reading an original data signal from a memory as an input data signal according to the start points, outputting the input data signal to be the output data signal, and then adjusting the input enable signals to be the output enable signals.

7. The device for transforming 2D images into 3D images according to claim 1, wherein the position calculation circuit generates the start points according to the display type of the panel and referring to a constant, a polynomial or a lookup table.

8. The device for transforming 2D images into 3D images according to claim 1, wherein relative depth relationships between the panel and a plurality of image frames corresponding to the image signals are related to an initial start point among the start points.

9. The device for transforming 2D images into 3D images according to claim 1, wherein difference values between the start points determine depth rages of a plurality of image frames corresponding to the image signals.

10. A method for transforming 2D images into 3D images, applied to a device for transforming 2D images into 3D images, the device including a position calculation circuit and an image processing block, the method comprising:

utilizing the position calculation circuit to generate a plurality of start points corresponding to a plurality of pixel lines of a panel according to a display type of the panel;

utilizing the image processing block to reshape a plurality of input enable signals corresponding to the pixel lines into a plurality of output enable signals according to the start points; and utilizing the pixel lines of the panel to display an output data signal as a plurality of image signals respectively according to the output enable signals, the image signals including a plurality of left-eye image signals and a plurality of right-eye image signals;

wherein in a current image frame, the start points corresponding to the odd pixel lines are at least monotonic decreasing, the start points corresponding to the even pixel lines are at least monotonic increasing, the image signals corresponding to the odd pixel lines are the left-eye image signals, and the image signals corresponding to the even pixel lines are the right-eye image signals.

11. The method for transforming 2D images into 3D images according to claim 10, wherein the image processing block includes an enable reshaping circuit, and the method further comprises:

utilizing the enable reshaping circuit to reshape the input enable signals into the output enable signals according to integer parts of the start points.

12. The method for transforming 2D images into 3D images according to claim 11, wherein the image processing block further includes a delay circuit and an interpolation circuit, and the method further comprises:

utilizing the delay circuit to delay an input data signal as a delay data signal; and utilizing the interpolation circuit to perform an interpolation operation on the input data signal and the delay data signal according to fractional parts of the start points to obtain the output data signal.

13. The method for transforming 2D images into 3D images according to claim 10, wherein the image processing block includes a direct memory access controller, a delay circuit and an interpolation circuit, and the method further comprises:

utilizing the direct memory access controller to read an original data signal from a memory as an input data signal according to integer parts of the start points, and adjust the input enable signals to be the output enable signals;

utilizing the delay circuit to delay the input data signal as the delay data signal; and utilizing the interpolation circuit to perform an interpolation operation on the input data signal and the delay data signal according to fractional parts of the start points to obtain the output data signal.

14. A method for transforming 2D images into 3D images, applied to a device for transforming 2D images into 3D images, the device including a position calculation circuit and an image processing block, the method comprising:

utilizing the position calculation circuit to generate a plurality of start points corresponding to a plurality of pixel lines of a panel according to a display type of the panel;

utilizing the image processing block to reshape a plurality of input enable signals corresponding to the pixel lines into a plurality of output enable signals according to the start points; and utilizing the pixel lines of the panel to display an output data signal as a plurality of image signals respectively according to the output enable signals, the image signals including a plurality of left-eye image signals and a plurality of right-eye image signals, wherein the image processing block includes a direct memory access controller, a delay circuit and an interpolation circuit, and the method further comprises:

utilizing the direct memory access controller to read an original data signal from a memory as an input data signal according to integer parts of the start points, and adjust the input enable signals to be the output enable signals;

utilizing the delay circuit to delay the input data signal as the delay data signal; and utilizing the interpolation circuit to perform an interpolation operation on the input data signal and the delay data signal according to fractional parts of the start points to obtain the output data signal;

wherein the image signals in a current image frame are the left-eye image signals and the start points are at least monotonic decreasing, and the image signals in a next image frame are the right-eye signals and the start points are at least monotonic increasing.

15. The method for transforming 2D images into 3D images according to claim 10, wherein the image processing block includes a direct memory access controller, and the method further comprises:

utilizing the direct memory access controller to read an original data signal from a memory as an input data signal according to the start points, output the input data signal to be the output data signal, and then adjust the input enable signals to be the output enable signals.

16. The method for transforming 2D images into 3D images according to claim 10, wherein the position calculation circuit is utilized to generate the start points according to the display type of the panel and referring to a constant, a polynomial or a lookup table.

17. The method for transforming 2D images into 3D images according to claim 10, wherein relative depth relationships between the panel and a plurality of image frames corresponding to the image signals are related to an initial start point among the start points.

18. The method for transforming 2D images into 3D images according to claim 10, wherein difference values between the start points determine depth rages of a plurality of image frames corresponding to the image signals.

19. The device for transforming 2D images into 3D images according to claim 5, wherein the position calculation circuit generates the start points according to the display type of the panel and referring to a constant, a polynomial or a lookup table.

20. The device for transforming 2D images into 3D images according to claim 5, wherein relative depth relationships between the panel and a plurality of image frames corresponding to the image signals are related to an initial start point among the start points.

21. The device for transforming 2D images into 3D images according to claim 5, wherein difference values between the start points determine depth rages of a plurality of image frames corresponding to the image signals.

22. The method for transforming 2D images into 3D images according to claim 14, wherein the position calculation circuit is utilized to generate the start points according to the display type of the panel and referring to a constant, a polynomial or a lookup table.

23. The method for transforming 2D images into 3D images according to claim 14, wherein relative depth relationships between the panel and a plurality of image frames corresponding to the image signals are related to an initial start point among the start points.

24. The method for transforming 2D images into 3D images according to claim 14, wherein difference values between the start points determine depth rages of a plurality of image frames corresponding to the image signals.

* * * * *